United States Patent [19]

Rushworth

[11] 4,309,746

[45] Jan. 5, 1982

[54] LASER SEEKER TARGET SIMULATOR

[75] Inventor: Paul M. Rushworth, Orlando, Fla.

[73] Assignee: Martin Marietta Corporation, Orlando, Fla.

[21] Appl. No.: 942,249

[22] Filed: Sep. 14, 1978

[51] Int. Cl.³ .......................... F21K 7/00; G08G 5/00
[52] U.S. Cl. ................................. 362/259; 89/41 L; 244/3.16; 340/25; 350/171; 350/293; 362/241; 362/310; 362/363; 250/228
[58] Field of Search ............... 340/25, 26; 350/170, 350/171, 293, 294; 362/363, 259, 297, 298, 300, 343, 241, 244, 246, 247, 310; 244/3.16; 89/41 L; 356/236; 250/228

[56] References Cited

U.S. PATENT DOCUMENTS

| | | | |
|---|---|---|---|
| 1,981,329 | 11/1934 | Rivier | 362/310 |
| 2,151,649 | 3/1939 | Birdseye et al. | 362/310 |
| 2,441,824 | 5/1948 | Kurlander | 362/310 |
| 2,848,639 | 8/1958 | Urban | 362/310 |
| 3,696,248 | 10/1972 | Cunningham et al. | 356/152 |
| 3,786,757 | 1/1974 | Goldstein et al. | 102/213 |
| 3,802,780 | 4/1974 | Helm et al. | 340/26 |
| 3,820,903 | 6/1974 | Kindl et al. | 356/138 |
| 3,874,799 | 4/1975 | Isaacs et al. | 356/236 |
| 3,920,336 | 11/1975 | Sackett | 356/236 |
| 3,932,023 | 1/1976 | Humer | 350/171 |
| 3,953,131 | 4/1976 | Britz | 356/152 |
| 4,054,364 | 10/1977 | Webster | 350/294 |
| 4,136,926 | 1/1979 | Sigler | 362/259 |

*Primary Examiner*—S. C. Buczinski
*Attorney, Agent, or Firm*—Julian C. Renfro; Gay Chin

[57] ABSTRACT

An emitting diffuser of electromagnetic radiation constructed as a three-dimensional body containing a reflective optical cavity. The cavity is coated with a highly reflective diffusion material over substantially its entire interior. The remaining interior surface is a transparent or translucent diffusion material forming a radiation exiting window, with the window geometry being selected to give a desired radiation pattern. The diffuser may receive energy from a laser source through an interconnecting light pipe, protecting near observers from the potentially eye damaging source emitted radiation. The light diffuser may be operated as a simulated target for laser-type target identification and tracking systems. A preferred embodiment of this invention is a hollow sphere in which the window is ring-shaped, and located substantially equidistant from the equatorial and upper polar region of the sphere.

39 Claims, 8 Drawing Figures

FIG. 1
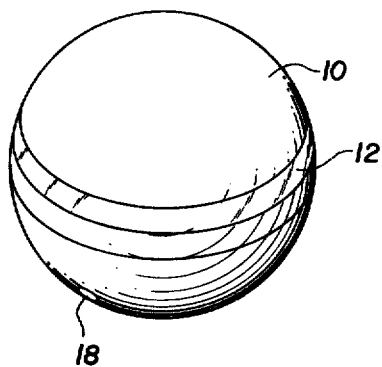
FIG. 2
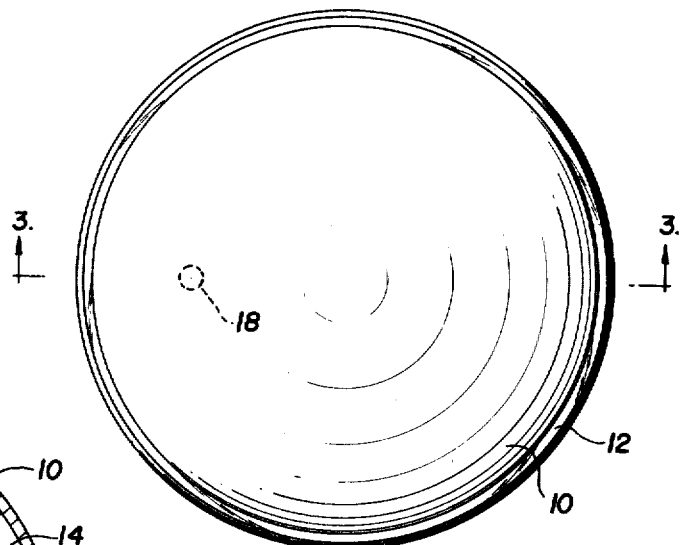
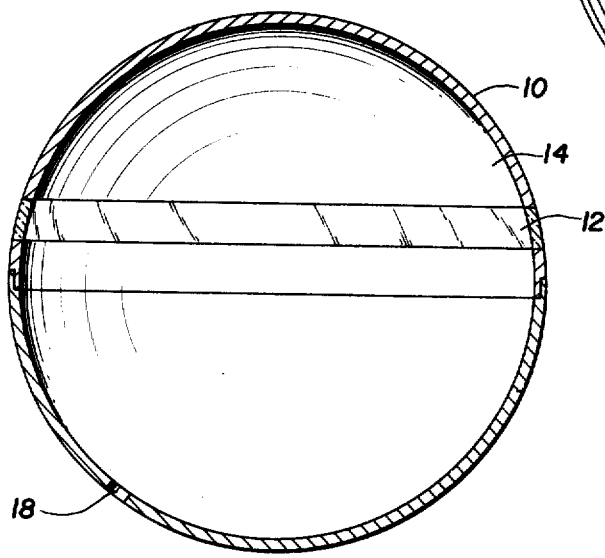
FIG. 3
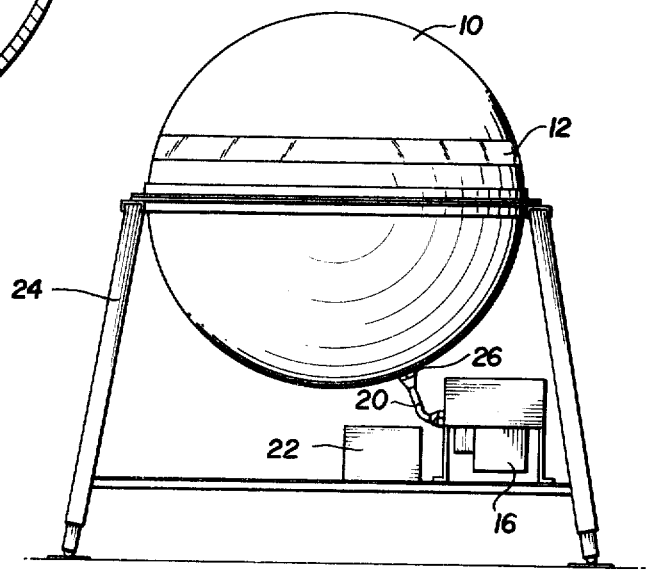
FIG. 6

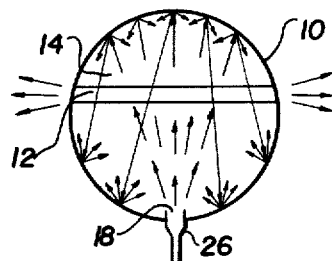
FIG 4
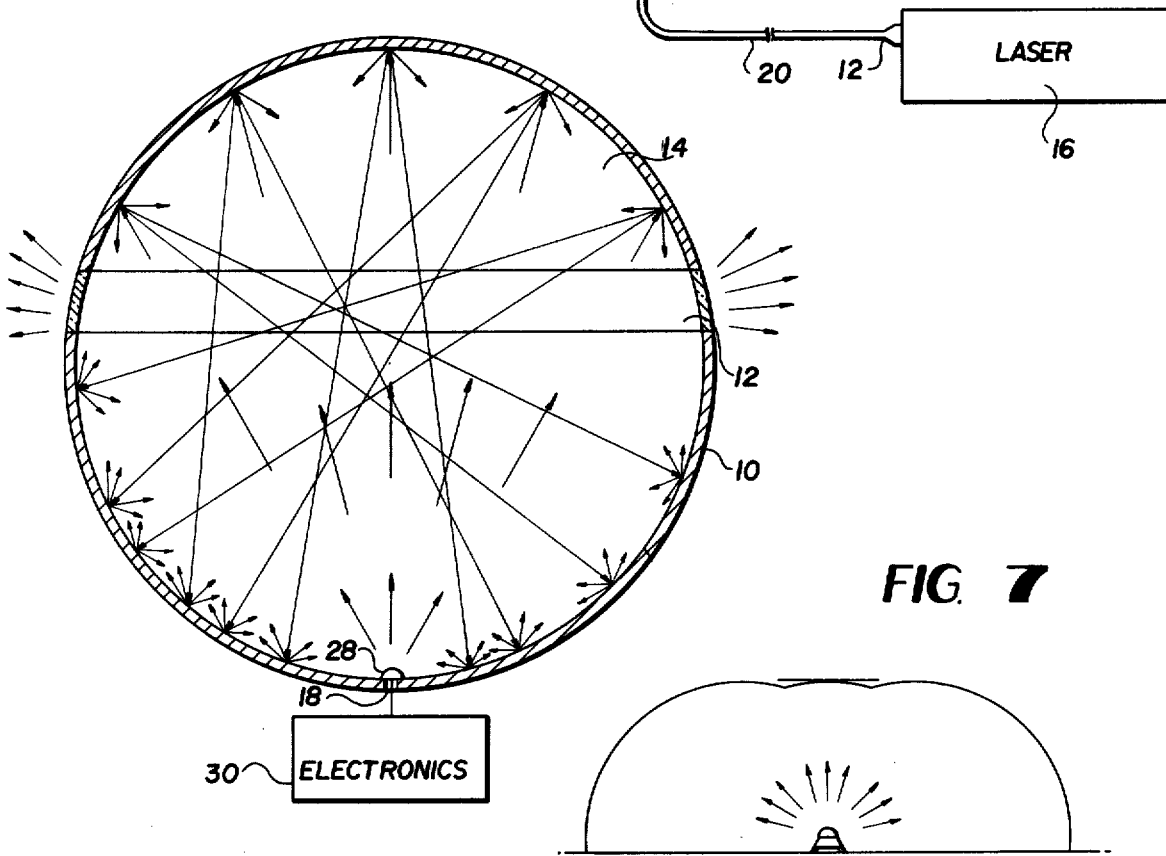
FIG. 5
FIG. 7
FIG. 8
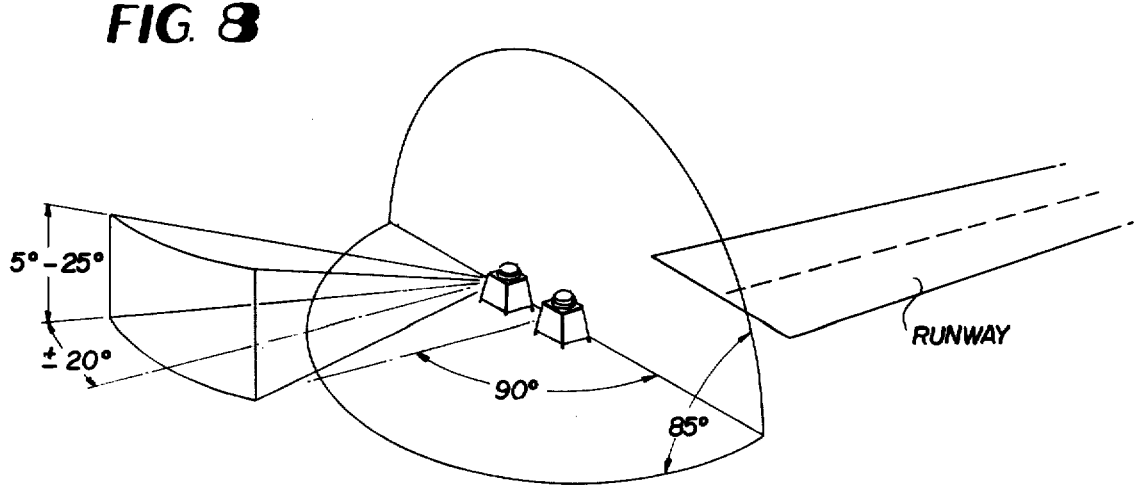

LASER SEEKER TARGET SIMULATOR

BACKGROUND OF THE INVENTION

The invention is in the field of laser target identification and acquisition devices often termed laser seekers, and particularly in the field of training and testing systems for such laser seekers. More specifically, the invention relates to a laser seeker target simulator which may be used in place of the conventional laser designator and cooperating target.

To understand the present invention, it is helpful to first understand the technology to which it relates. Aircraft supporting ground operations often use laser-type target designator and identification systems. The laser designator, manned by forward observers, generates a source of laser radiation which is directed to a selected target. The target reflects the received radiation to the identification section of the system, the laser seeker. The laser seeker scans the earth's surface in a selected pattern until it acquires the laser energy reflected from the pinpointed target. The seeker, which is generally mounted on the aircraft, includes processing equipment for generating usable indicia of target acquisition. For example, the seeker system, interfaced with an aircraft's avionics, can be made to produce indications of target acquisition to the pilot by means of a laser track signal on the aircraft heads-up display. The laser seeker system has the further capability of locking onto the target. Upon target lock the seeker ends its scan mode of operation and continues to track the target as the aircraft continues its movement relative to the target.

There is a need for a low-cost, eye safe, training device in the form of a simulated target that can be easily and economically deployed at training centers and target ranges. Such a training device would permit the operator of the laser seeker to exercise his equipment during simulated missions. In addition, the simulated target would permit the testing of the seeker equipment through its full range of capability. It was to meet the needs for such a target device that the present invention was created.

SUMMARY OF THE INVENTION

The invention is directed to an electromagnetic radiation diffusion body which may be operated as a laser seeker target simulator.

A laser seeker of a target designator/identification system cooperates with a laser designator to locate a target often obscured from visual sight. In a conventional target designator/identification system, the laser designator generates a beam of laser energy having specified parameters recognizable by a remote seeker. The laser energy is pointed to a selected target where it is reflected without appreciable loss of its identifying parameters. The selected parameters code the transmitted energy allowing the seeker to pick out the target reflected radiation from surrounding radiation. More specifically, it is known for a laser designator to transmit pulse coded, narrow bandwidth laser radiation in the non-visible range. For example, the laser source may transmit pulse energy centered at a wavelength of 1.064 microns with a bandwidth of approximately 2 angstroms ($2 \times 10^{-4}$ microns). Pulse widths on the order of 20 nanoseconds spaced anywhere from approximately 50 to 100 milliseconds apart have been found suitable in laser-type target identification systems.

The laser seeker does not see the target shape but rather sees the reflected radiation as a point source of light much as a star appears to a human observer. It uses the parameters of the received laser radiation, that is, very narrow bandwidth and very narrow pulse width, along with system parameters such as pulse repetition frequency to identify the target from various other types of radiation in the target background. It is noted that in an operational target identification system, only approximately 10 percent of the radiation which strikes the target is diffusely reflected in effectively all directions and an extremely small portion of this energy actually reaches the laser seeker which is then capable of noting the location of the target through the use of system optics and electronics generally carried by the seeker bearing aircraft.

Typically, to achieve target identification at the seeker, a certain minimum level of brightness must exist at the target just as a given light placed several miles from human eyes would have to have a specific brightness for it to be seen. This requirement of a minimum brightness compels the laser designator to emit a relatively high intensity beam of radiation. This level of radiation is such that anyone struck by the designator beam may very well sustain vision damage. More specifically, a typical low level designator emits 100 millijoules of light in each pulse or burst of light. The pulses are typically 20 nanoseconds wide which results in a peak power at the aperture of the laser designator of 5 megawatts. The human eye can safely receive energies on the order of $2 \times 10^{-6}$ joules per square centimeter or 100 watts per square centimeter at a laser wavelength of 1.0640 microns which wavelength is often used in conventional designator/identification systems. Thus, the laser emission from a laser designator may be at an energy level of approximately 50,000 times the eye-safe level. The designator beam energy spreads or diffuses as it travels away from the reflecting target. As the beam spreads, its energy or peak power per square centimeter diminishes. By the time it reaches the aircraft carrying the laser seeker, its intensity has decreased to a level well below that intensity at which eye damage may occur. Significantly, it has been determined that the energy required for a typical laser seeker to detect a target is relatively low and may be many orders of magnitude below the eye-safe level. However, the energy from the laser designator striking the target can easily cause eye damage to an observer in that target area.

According to the teachings of the present invention, the use of the laser designator in its commonly used mode is eliminated where eye safety is a problem. This is accomplished through the use of a specially constructed electromagnetic radiation diffusion body which emits laser radiation roughly equivalent to the energy reflected from a target receiving laser energy from a designator device. The radiation from the target simulator of the present invention has all the properties of the laser designator emission thereby allowing the seeker to recognize this radiation as a target.

It is, therefore, a primary object of my invention to provide a diffuse emitter of electromagnetic radiation, which serves as an effective target for a laser seeker or the like, and which operates in a highly efficient and eye-safe manner.

It is another object of my invention to provide an electromagnetic radiation emitter capable of converting a source of highly concentrated light energy into a diffuse light pattern.

A further object is to provide an electromagnetic radiation diffuser which can convert a potentially eye damaging source of radiation, which is not necessarily in the visible range, into electromagnetic energy radiating at an energy level safe to the human eye.

A still further object is to provide a laser energy diffuser which can emit diffused laser energy in a selected pattern.

An additional object is to provide a laser energy diffuser which can operate as a laser seeker target simulator.

These and other objects, as more specifically set out herein, are achieved by a unique diffusion body, preferably of spherical shape, designed to receive concentrated electromagnetic radiation produced by a suitable source such as a laser and emit eye-safe radiation in a selected pattern. The diffusion body may, for example, be constructed as a hollow sphere internally coated with diffusing materials. A substantial portion of the sphere interior is coated with a highly reflective diffusion material while a relatively small selected area of the sphere interior is transparent or translucent diffusion material to produce a light exiting window. An entrance aperture may be located at a suitable location, generally within the lower hemisphere of the spherical body, to receive the concentrated electromagnetic radiation from an external source. The received energy is internally reflected with little absorption, by means of the highly reflective diffusion material until it strikes the transparent or translucent diffusion window. The radiation impinging on the diffusion window exits the sphere in a pattern determined by the window geometry. Preferably, the window is ring-shaped and located about the upper hemisphere of the spherical diffusion body.

BRIEF DESCRIPTION OF THE DRAWINGS

FIG. 1 is a three dimensional representation of a spherical electromagnetic radiation diffuser of the invention with a ring-shaped emitting window;

FIG. 2 is a top view of the spherical electromagnetic radiation diffuser shown in FIG. 1;

FIG. 3 illustrates a cross-section of the spherical light diffuser illustrated in FIG. 1 and taken across section 3—3 shown in FIG. 2;

FIG. 4 is a schematic representation of a spherical diffuser of the invention connected to a source of laser radiation through a light pipe;

FIG. 5 illustrates an alternate embodiment of the invention where the source of radiation is contained within a hollow spherical body forming the diffuser of the invention;

FIG. 6 illustrates a technique for mounting the diffuser of the invention in a mounting also carrying a laser source for supplying radiation to the diffuser and a power source for the laser source;

FIG. 7 is a diagrammatic representation of the diffused radiation emitted by the spherical diffuser having a ring-shaped window area; and FIG. 8 illustrates the application of the present invention as an aircraft landing aid.

DETAILED DESCRIPTION OF THE PREFERRED EMBODIMENTS

Figure 1A:
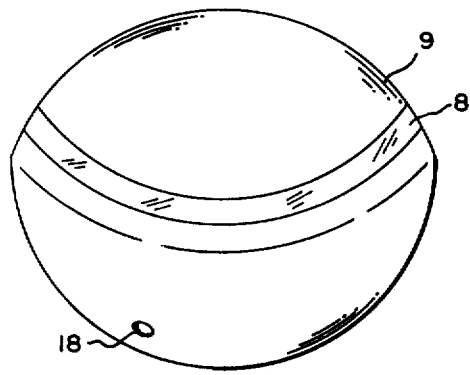
FIG. 1A is a three dimensional representation of an oblate spheroid diffuser of the invention having an elliptical-shaped emitting window.
Figure 1B:
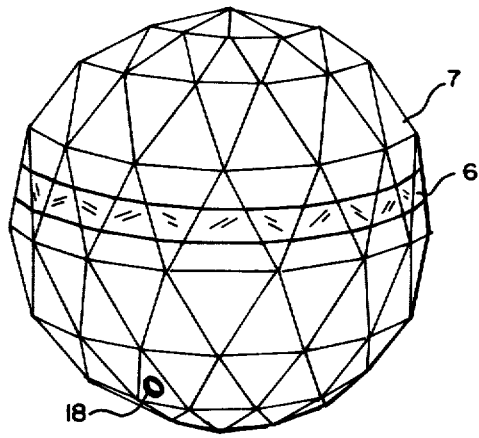
FIG. 1B is a three dimensional representation of a polyhedron diffuser of the invention having a ring-shaped emitting window.
Figure 1C:
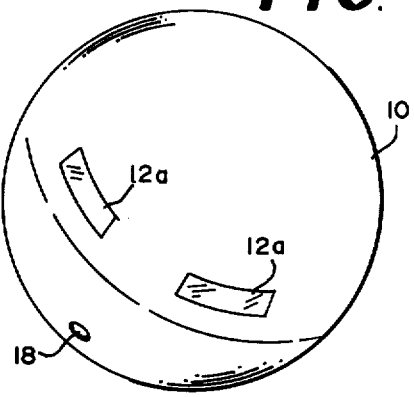
FIG. 1C is a three dimensional representation of the spherical diffuser of the invention having the ring-shaped emitting window partially blocked for forming a non-omnidirectional emission pattern.

Turning to FIG. 1, it will be seen that I have illustrated an exemplary embodiment of a diffuser in accordance with this invention, which in this instance is in the form of a hollow spherical body 10 having an output window or emission surface 12 which body is internally coated with a highly reflective diffusion material. It is most important to note, however, that I am not to be limited to the hollow spherical diffuser illustrated in FIG. 1, and for example, I can use—with varying degrees of efficiency—any of a wide range of three dimensional bodies, such as an oblate spheroid 9 as shown in FIG. 1A and a polyhedron 7 as shown in FIG. 1B, as long as a reflective optical cavity in each instance is defined inside such body. The purpose of the reflective optical cavity is to transform energy emanating from a source of electromagnetic radiation into a uniform distribution of diffuse radiation within the three-dimensional body. In other words, by providing a cavity 14 having a substantially continuous, essentially spherical surface, I am assured of having a comparatively large number of random reflective paths, that serve to provide a considerable amount of diffuse electromagnetic radiation in a very efficient manner at the window 12. Other examples of three-dimensional bodies usable as a diffuser in accordance with this invention may include any of several different types of polyhedrons, which can have cavities made up of spherical, or non-spherical surfaces, with it being understood that if a cavity is made up of a number of plano parallel surfaces, they are in each instance rendered diffuse so that spectrally reflected light cannot emanate from the emission surface of the body.

The output window of a diffuser in accordance with this invention can take the form of multiple ports, but I prefer for the window to be ring-shaped, and to be located fairly high on the body so that the diffuse radiation output will be directed at an angle to the horizon, and thus be clearly visible yet in an eye-safe manner, to laser seekers carried in aircraft. An omnidirectional pattern is usually preferred, but if desired for some sectors not to be illuminated, appropriate portions of the window can be blanked off as shown by the partial windows 12a in FIG. 1C.

Returning to the preferred embodiment of the diffuser, in FIGS. 2 and 3, I have shown that the diffuser can be constructed from two interlocking hemispheres, but quite obviously, it is within the spirit of this invention to manufacture the radiating body in accordance with other procedures. The sphere may be made of any suitable material which will withstand continuous exposure to laser radiation, and one such material is polycarbonate.

The entire interior of the hollow body, except for the window 12, is coated with a highly reflective material capable of diffusing incident radiation, and an example of a suitable coating is magnesium oxide. Even the window area itself is at least a partially transmitting material also capable of diffusing incident radiation, and an example material for the window area is polycarbonate, provided with a finely ground surface.

Another example of cavity construction could involve sandblasting the cavity walls so as to render them rough, after which they could be coated with silver or any other reflective material, with the result that a diffused radiation pattern would result.

The electromagnetic energy evolving from my diffuser can originate in the cavity 14 of the device, but in the typical instance it originates at a remotely located laser 16, with the energy therefrom being supplied to the light entrance aperture or inlet port 18 of the body, such as by a fiber optic light pipe 20. FIG. 4 thus illustrates the instance where the radiation source 16 is located external to the diffuser while FIG. 5 illustrates an example of a device fabricated in accordance with the teachings of my invention where, as discussed hereinafter, the radiation energy originates within the cavity of the device. It is to be noted that in both configurations, the diffuser is constructed to cause the energy from the radiation source to take several bounces within the cavity before emanating from the window 12. With the radiation exiting window 12 located in the upper hemisphere of a spherical cavity, it is preferable to locate the entrance aperture 18, in the case of FIG. 4 configuration, in the lowermost part of the cavity to obtain several internal reflections before significant amounts of radiation reach the window.

Similarly, where as in the FIG. 5 embodiment of the invention, the radiation source 28 is internally mounted to the cavity, the source along with the inlet port 18 are preferably mounted in the lowermost portion of the cavity. However, my invention is not to be limited to any specific location for either the entrance aperture 18 or radiation source, and other locations besides that discussed may be used so long as the radiation can take several bounces before exiting from window 12.

Figure 6A:
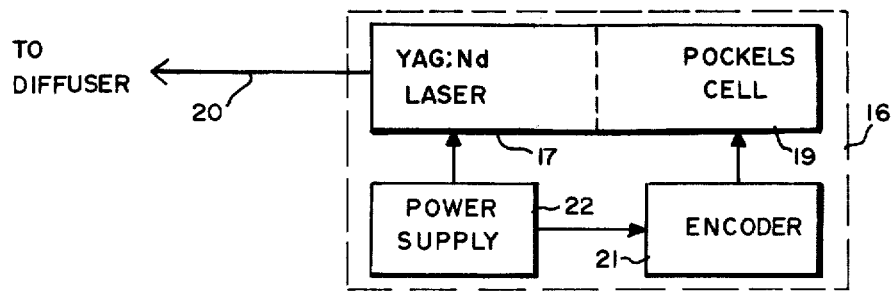
FIG. 6A represents a block diagram of a typical laser suitable for a test device utilizing the invention.

A suitable laser source 16 to be connected to the body by suitable means such as a light pipe, is a pulsed YAG:Nd laser, Q-switched with a lithium niobate Pockels cell line 30, 19 shown in FIG. 6A. Such a laser source is known and previously used in fire control systems. The Q-switched laser is particularly suitable as a source for the diffuser for it can be made to operate with a pulse configuration by means of encoder 21 that matches the pulse parameters which are recognized by a laser seeker. The YAG:Nd laser 16 is portable and has a portable primary power source which may be a battery producing 24 to 28 volts D.C. at 12 amperes of current. The diffuser of this invention may be less than one foot in diameter and weight less than five pounds, making a package consisting of the diffuser, laser source and primary power source easily man portable, allowing it to be located in remote areas.

According to the teachings of the present invention, a diffusion body 10, an external laser source 16, and the power supply 22 can be packaged, as illustrated in FIG. 6, in a single man portable mounting utilizing a plurality of supporting legs 24.

Figure 4A:
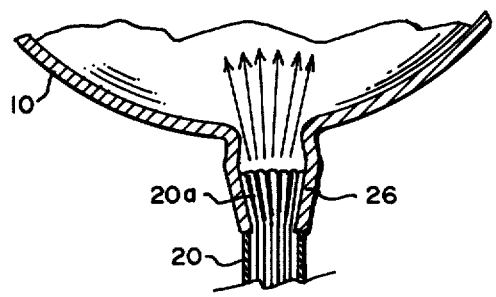
FIG. 4A represents a partial view of the diffuser of FIG. 4 showing in more detail the conical shaped section.
Figure 4B:
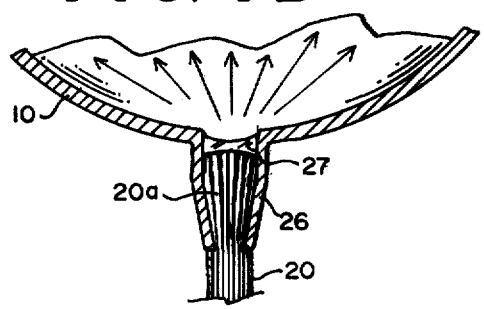
FIG. 4B shows a partial view of the diffuser of FIG. 4 showing a more detailed view of the conical shaped section including a negative lens.

To protect observers in the vicinity of the emitting diffuser, the energy output from the laser source can in each instance be coupled to the respective light entrance aperture 18 by means of a fiber optic light pipe 20 sheathed in a metallic monocoil with a polyvinyl chloride covering. The light pipe may be provided with a conical end section 26 as illustrated in FIG. 4, 4A, and 4B, and in FIG. 6. As shown in FIGS. 4A and 4B, the fiber optic strands 20a are flared to form conical section 26. The conical section 26 at the output of the laser source provides space for filters as needed. For example, a covert filter may be included to provide strong attenuation of any visible radiation produced by the laser source. The conical section 26 at the input to the spherical diffuser functions to convert the collimated laser beam from the source 16 to a more widely spread source as it enters the diffuser. A fiber optic light pipe with conical end sections is known in the art and does not per se form a portion of the present invention. To aid in the dispersion of the source beam as it enters the spherical diffuser a negative lens 27 may be mounted in the entrance aperture 18 to which the light pipe is connected as seen in FIG. 4B.

Figure 5A:
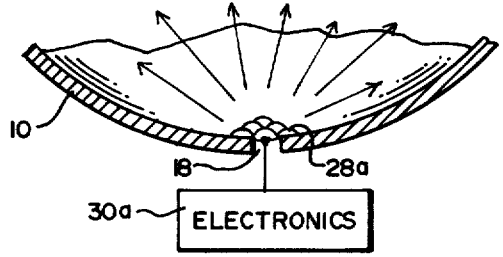
FIG. 5A shows a partial view of the alternate embodiment of the invention of FIG. 5 in which the source of radiation is an array of light emitting diodes.

Referring again to FIG. 5, the diffuser may as previously stated be constructed with a radiation source located within the body cavity. With such a construction the source may take the form of a light emitting diode, preferably a laser diode 28. However, other suitable sources may of course be used, such as an array 28a as shown in FIG. 5A. A connecting aperture 18 permits connection of the radiation source, such as the array of light emitting diodes 28a with electronics 30 functioning to power these diodes.

A spherical diffuser with a ring-shaped window 12 produces a desirable lambertian pattern simulating laser energy reflected from a large diffuse reflector. Such a pattern is realized when a laser designator beam is reflected from a target such as a tank, truck, or jeep. A lambertian pattern is one where the radiation intensity is proportional to the cosine of the angle with the normal to the emitting surface. The radiation pattern emitted by the hollow spherical diffusion body of the present invention is illustrated in FIG. 7.

The diffusion body of the present invention is a completely passive device. The device has a highly reflective, diffuse coating on its inner surface and is provided with the diffuse window area to permit electromagnetic radiation emission in a desired pattern, and an input port allowing laser radiation to enter the sphere and be diffusely reflected or scattered over the entire inner surface. The diffuse window surface is uniformly illuminated and essentially all of the laser radiation exits the sphere through the window area. The size and configuration of the window area determines the emission pattern. For an omnidirectional pattern simulating the reflected radiation from a true target the diffusion body is preferably spherical shaped, the window should be ring-shaped. To insure uniform illumination of the window, the ratio of the window area to the inner area of the sphere should be small. For a ring-shaped window the pattern of radiation for the sphere described is donut-shaped with a near lambertian cross-section. The intensity is maximum at a direction normal to the tangent plane at the center of the window and decreases approximately as a function of the cosine of the angle from the normal. Such a pattern presents maximum illumination to an aircraft traveling along its normal line of attack and thus is ideal for target simulation purposes.

When a spherical diffuser is used in conjunction with a low-powered Q-switched laser as a laser seeker target simulator, the emitted radiation is eye-safe even at locations very close to the diffuser. Since the emission pattern is omnidirectional with the ring-shaped window, target acquisition is available from any direction. Further, when the spherical diffuser is used with a pulsed YAG:Nd laser, Q-switched with a lithium niobate Pockels cell, the power generated at the output of the diffuser is effectively equivalent to the power radiated by a true target and can be coded with the radiation pattern which can be recognized by a laser seeker.

As a target simulator, the spherical diffuser can be used in either a stationary or mobile target. To simulate a mobile target, the spherical diffuser along with its laser source can be mounted onto a suitable vehicle such as a pick-up truck. In a true operational environment, a moving target will be intermittently masked by various terrain features such as hills, trees, or other less important vehicles and man-made structures. This intermittent masking of the target to the laser designator and masking of the reflected target signature to the laser seeker represent the true operational conditions that a pilot of a laser seeker equipped aircraft will encounter in an actual situation. To simulate this effect, the laser source of the mobile mounted simulated target may be switched on and off at various intervals thereby simulating terrain obstructions.

The diffuser of the present invention may find application in areas besides target simulation. For example, the diffuser may be used as part of a pre-flight checkout system for a laser seeker. Such a checkout system would verify, prior to flight, that the laser seeker will function properly in all modes of operation. Specifically, such a checkout system would verify that the laser seeker will acquire and track an externally generated, pulse coded signal prior to takeoff. In such a checkout system, the diffuser along with its laser source would be located at some distance off a runway or taxi strip. Prior to takeoff, the pilot need only activate his laser seeker and run it through its normal modes of operation using the emission from the diffuser as the reference point for verifying proper operation of his system.

A further use of the present invention is in laser aided landing systems. When used as part of a landing aid, the emission pattern is preferably modified as illustrated in FIG. 8. To change the emission pattern, one need only modify the window geometry of the diffuser. The cooperating aircraft would be provided with a laser seeker. The landing aid would be controlled by the tower and turned on to emit radiation as an aircraft approaches the landing field. This would permit a pilot to identify a runway at ranges significantly beyond the capability of the unaided eye. In one embodiment of a laser landing aid which makes use of a spherical diffuser of the present invention, a suitable radiation source coupled into the diffuser would be pulsed at 10 pps to generate an identifiable code to the aircraft. The emission pattern would be such that it would illuminate the approach to ±90 degrees of the runway center line in azimuth and from +5 to +90 degrees in elevation. In a second embodiment of the landing aid, the radiation source cooperating with the diffusion sphere could operate at 20 pps and illuminate the runway to ±20 degrees in azimuth and +5 to +20 in elevation. It is envisioned that two such landing aids can be located at a single location each generating a different pulse code and area of illumination to thereby assist the pilot in locating his aircraft relative to the runway.

A major advantage of using the device of the present invention as a landing aid is that the information received by the aircraft can be displayed on the heads-up display and the pilot does not have to divide his attention during the critical portion of the approach between his outside visual reference and a console mounted device in the cockpit. This device is thus seen to be an easily portable signal source which provides eye-safe laser pulses for rapid checkout of laser seekers and receivers in a flightline environment, and also readily lands itself for pilot training as well as correct identification of a specific ground location. The functions provided include realistic simulation of frequency, pulse width, and PRF of tactical laser designators.

What is claimed:

1. A diffuser for emitting electromagnetic radiation comprising:
a three dimensional body having an input in the form of coherent electromagnetic radiation, said body defining a reflective optical cavity illuminated by said input, with a substantial proportion of the area of the cavity walls being covered by a highly reflective diffusion material such that the energy emanating from said input results in a substantially uniform distribution of electromagnetic radiation within said three dimensional body, said body defining an emission surface of at least some angular extent, located in a non-aligned relationship to said input, from which surface, reflected electromagnetic radiation can be emitted and thus provide diffused illumination, wherein essentially all of said input electromagnetic radiation is emitted, said diffuser providing an eye-safe level of illumination through said surface, such illumination being detectable several miles away.

2. The diffuser as recited in claim 1 in which said emission surface is essentially ring-shaped, and disposed in the upper portion of said body.

3. The diffuser as recited in claim 2 in which a portion of said emission surface is blanked off, so as to prevent illumination of a selected sector.

4. The diffuser as recited in claim 1 in which the source of electromagnetic radiation is contained in said cavity.

5. The diffuser as recited in claim 4 in which said source of electromagnetic radiation is an array of light emitting diodes.

6. The diffuser as recited in claim 1 further including an input port and wherein the source of electromagnetic radiation is remotely located, and connected to the input port located in said cavity by a light pipe.

7. The diffuser as recited in claim 6 in which said light pipe includes a conically shaped section for causing the radiation output from said light pipe to enter reflective optical cavity in the form of a cone of radiation.

8. The diffuser as recited in claim 6 in which a negative lens is located in said input port.

9. The diffuser as recited in claim 1 in which said source of radiation is a Q-switched, pulsed YAG:Nd laser.

10. The diffuser as defined in claim 1 in which said body is substantially spherical.

11. The diffuser as defined in claim 1 in which said body is an oblate spheroid.

12. The diffuser as defined in claim 1 in which said body is a polyhedron.

13. A laser target simulator for use with a laser seeking system comprising:
   a diffuser for electromagnetic radiation having a three dimensional body having means to receive an input source of energy in the form of coherent collimated electromagnetic radiation, said body defining a reflective optical cavity illuminated by said input source, the interior walls of said cavity being covered to a substantial extent by a highly reflective diffusion material and thus providing a means for transforming the energy emanating from said input source into a substantially uniform distribution of electromagnetic radiation within said three dimensional body, said body defining a window of at least some angular extent, through which diffused electromagnetic radiation at a level of illumination which will not damage the human eye can escape at a sufficient energy level as to be detectable several miles away, said radiation representing essentially all of said input energy;
   said input source of electromagnetic radiation being non-aligned with said window; and
   means for introducing the source-generated electromagnetic radiation into said reflective optical cavity.

14. The laser target simulator as recited in claim 13 in which said means for introducing energy is a light pipe.

15. The laser target simulator as recited in claim 14 in which said light pipe is sheathed in a light blocking covering.

16. The laser target simulator as recited in claim 14 in which said light pipe is provided with a conical end section for spreading the output beam as it enters said diffuser.

17. The laser target simulator as recited in claim 13 wherein said window is essentially ring-shaped and disposed in the upper portion of said body.

18. The laser target simulator as recited in claim 13 in which said source of electromagnetic energy is a YAG:Nd laser, Q-switched with a lithium niobate Pockels cell.

19. The laser target simulator as recited in claim 13 in which said body is polycarbonate.

20. A testing system for an electromagnetic energy-type target identification system comprising:
   a diffuser for emitting electromagnetic radiation representative of the reflection of such radiation from a target comprising a spherical body having an input for a source of electromagnetic energy in the lower hemisphere of said body, said body defining a reflective optical cavity illuminated by said source of energy, a substantial portion of the inner sidewalls of said cavity being covered by a highly reflective diffusion material for transforming the energy emanating from said source of energy into a substantially uniform distribution of electromagnetic radiation within said three-dimensional body, said body defining a ring-like window essentially transparent to the reflected and diffused electromagnetic energy, said window disposed in the upper hemisphere of said body concentric with the vertical axis of said body, said input and said window located to cause essentially all of the reflected and diffused electromagnetic energy to escape and thus provide a radiation pattern simulating electromagnetic radiation reflected from a target, said diffuser providing an eye-safe level of radiation through said window while at the same time assuring that the radiation is of a sufficient energy level as to be detectable several miles away said pattern recognizable by a target identification system;
   a source of coherent electromagnetic energy having coding means for producing such energy in a pulse code pattern recognizable by a target identification system; and
   means for introducing the source produced coded electromagnetic energy into the optical cavity in a manner non-aligned with said window.

21. The testing system as recited in claim 20 in which said source of energy is a laser source remotely located and said means for introducing the source produced energy into the optical cavity is a light pipe.

22. The testing system as recited in claim 21 in which said light pipe is sheathed in a light blocking covering.

23. The testing system as recited in claim 22 in which said light pipe is provided with a conical end section.

24. The testing system as recited in claim 21 further including a power source for said source of electromagnetic energy and a portable mounting means for retaining said diffuser source of energy and power source in an operational position.

25. The testing system as recited in claim 20 in which said source of energy is an electromagnetic radiation source contained in said optical cavity.

26. A training and testing simulator for laser target identification and acquisition devices comprising:
   a spherical cavity having a substantial portion of the interior surface of the cavity walls covered by a reflective diffusion material for radiating low intensity laser energy representative of such radiation reflected from a target, said energy having an intensity below the eye-safe level, said diffusion means having an entrance aperture;
   a radiating window in the wall of said spherical cavity through which diffused laser energy passes, said window disposed in the upper hemisphere of said cavity; and
   a source of laser energy having an output coupled to said entrance aperture for introducing laser energy into said diffusing means, said entrance aperture located in the lowermost part of said spherical cavity so as to cause a multiplicity of internal reflections of laser energy entering said cavity via said aperture before significant amounts of radiation are radiated through said window.

27. The simulator as defined in claim 26 in which said window is ring-shaped and concentric with the vertical axis of said spherical cavity, said ring-shaped window adapted to produce an omnidirectional lambertian pattern simulating laser energy reflected from a large diffuse reflector.

28. The simulator as defined in claim 26 in which said source of laser energy is coupled to said entrance aperture by means of a fiber optic light pipe.

29. The simulator as defined in claim 28 in which said entrance aperture includes a conical section providing space for optical fibers, said conical section for converting the laser input energy to a more widely spread source as it enters said diffusion means.

30. The simulator as defined in claim 27 in which said window and said entrance aperture are located so that the surface of said window is uniformly illuminated by said diffused laser energy and that essentially all of said laser energy exits said spherical cavity through the window area.

31. The simulator as defined in claim 30 in which the ratio of the area of said window to the inner area of said sphere is small.

32. The simulator as defined in claim 26 in which said radiated low intensity laser energy is radiated in an omnidirectional pattern having a maximum intensity at a direction normal to the tangent plane at the center of said window and which decreases approximately as a function of the cosine of the angle from the normal.

33. A laser illuminated target simulator comprising:
   a low power laser for producing a beam of pulse coded narrow bandwidth laser radiation;
   a spherical cavity diffusion body having an input aperture for accepting an input laser beam and an output window adapted to radiate diffused laser energy representative of radiation from a laser illuminated target, said radiated energy being radiated in a pattern omnidirectional in azimuth and in a near lambertian pattern in elevation and below an intensity level harmful to the human eye; and
   coupling means connected between said laser and said input aperture for introducing the laser beam from said laser into said diffusion body.

34. The simulator as defined in claim 33 in which said window is formed from a partially transmitting material having a capability of diffusing incident laser radiation exiting said body via said window.

35. The simulator as defined in claim 34 in which:
   the inner walls of said diffusion body is coated with magnesium oxide; and
   said window material is polycarbonate having a finely ground surface.

36. A laser aided landing system for use with aircraft having a laser seeker comprising:
   a low power laser for producing a beam of pulse coded narrow bandwidth laser radiation;
   a spherical diffusion body having an input aperture for accepting an input laser beam adapted for installation in the approach to a landing runway;
   an output window disposed in said body for radiating diffused laser energy from said laser beam, said radiated energy being below an intensity level harmful to the human eye, said output window adapted to have an emission pattern for illuminating the approach for a first selected angular range of the runway center line in azimuth and for a second selected angular range of the runway center line in elevation; and
   coupling means connected between said laser and said input aperture for introducing the laser beam from said laser into said diffusion body.

37. The landing system as defined in claim 36 in which:
   said first selected angular range is selected to be ±90°; and
   said second selected angular range is selected to be +5° to +90°.

38. The landing system as defined in claim 36 in which:
   said first selected angular range is selected to be ±20°; and
   said second angular range is selected to be +5° to +20°.

39. A laser aided landing system for use of aircraft having a laser seeker comprising:
   first and second low power lasers, said first laser producing a beam of narrow bandwidth laser radiation pulses at a first pulse repetition rate, and said second laser producing a beam of narrow bandwidth laser radiation pulses at a second pulse repetition rate;
   a first spherical diffusion body having an input aperture coupled to said first laser for introduction of the first laser beam into said first body, and a second spherical diffusion body having an input aperture coupled to said second laser for introduction of said second laser beam into said second diffusion body, said first and second spherical diffusion bodies adapted for collocated installation in the approach to a landing runway; and
   a first output window disposed in said first body for radiating diffused laser energy from said first laser beam, said radiated energy being below an intensity level harmful to the human eye, said first output window adapted to have an emission pattern for illuminating the approach to ±90° of the runway center line in azimuth and from +5° to +90° in elevation, and second output window disposed in said second body for radiating diffused laser energy from said second laser beam, said radiated energy being below an intensity level harmful to the human eye, said second output window adapted to have an emission pattern for illuminating the approach to ±20° in azimuth and from +5° to +20° in elevation, said first and second diffusion bodies thereby cooperating in defining the location of the runway to an airborne laser seeker.

* * * * *